(12) United States Patent
Ham

(10) Patent No.: US 7,992,497 B1
(45) Date of Patent: Aug. 9, 2011

(54) TACTICAL WEAPONS SYSTEM AND METHOD OF USE

(76) Inventor: Jerry D. Ham, Roanoke, VA (US)

( * ) Notice: Subject to any disclaimer, the term of this patent is extended or adjusted under 35 U.S.C. 154(b) by 1480 days.

(21) Appl. No.: 10/738,417

(22) Filed: Dec. 17, 2003

Related U.S. Application Data

(60) Provisional application No. 60/437,813, filed on Jan. 2, 2003.

(51) Int. Cl.
*F42B 12/46* (2006.01)
(52) U.S. Cl. ........................................ 102/367
(58) Field of Classification Search .................. 102/367, 102/370, 502, 512; 89/1.1, 1.11
See application file for complete search history.

(56) References Cited

U.S. PATENT DOCUMENTS

| | | | | |
|---|---|---|---|---|
| 2,096,698 A | * | 10/1937 | Lowy et al. ................... | 102/370 |
| 2,813,753 A | * | 11/1957 | Roberts ......................... | 239/271 |
| 2,857,005 A | * | 10/1958 | Medlock ........................ | 169/62 |
| 3,833,064 A | * | 9/1974 | Ranney, Jr. ..................... | 169/52 |
| 4,046,055 A | * | 9/1977 | McDanolds et al. ............. | 86/50 |
| 4,598,096 A | * | 7/1986 | Grant ............................. | 514/715 |
| 4,798,143 A | * | 1/1989 | Graham ......................... | 102/370 |
| 5,062,486 A | * | 11/1991 | McClenahan ................... | 169/70 |
| 5,088,174 A | * | 2/1992 | Hull et al. ....................... | 29/254 |
| 5,177,850 A | * | 1/1993 | Hull et al. ....................... | 29/254 |
| 5,651,417 A | * | 7/1997 | Coughlin ....................... | 169/51 |
| 6,349,650 B1 | * | 2/2002 | Brunn et al. ................... | 102/368 |
| 6,393,992 B1 | * | 5/2002 | Vasel et al. .................... | 102/502 |
| 6,641,088 B2 | * | 11/2003 | Suchar ......................... | 244/118.5 |

* cited by examiner

*Primary Examiner* — Stephen M Johnson
(74) *Attorney, Agent, or Firm* — James W. Hiney

(57) ABSTRACT

An inert tactical weapons system and method of use thereof, said system being a non-lethal application system designed to deal with terrorists and hostage situations. It consists of pumping an inert gas into a structure in which hostages are being held, the inert gas displacing the oxygen in the air within the structure and rendering all those within unconscious. Prompt venting after the initial incapacitation renders all those affected conscience within a few minutes and does no permanent harm.

1 Claim, 8 Drawing Sheets

TACTICAL WEAPONS SYSTEM AND METHOD OF USE

Figure 1:
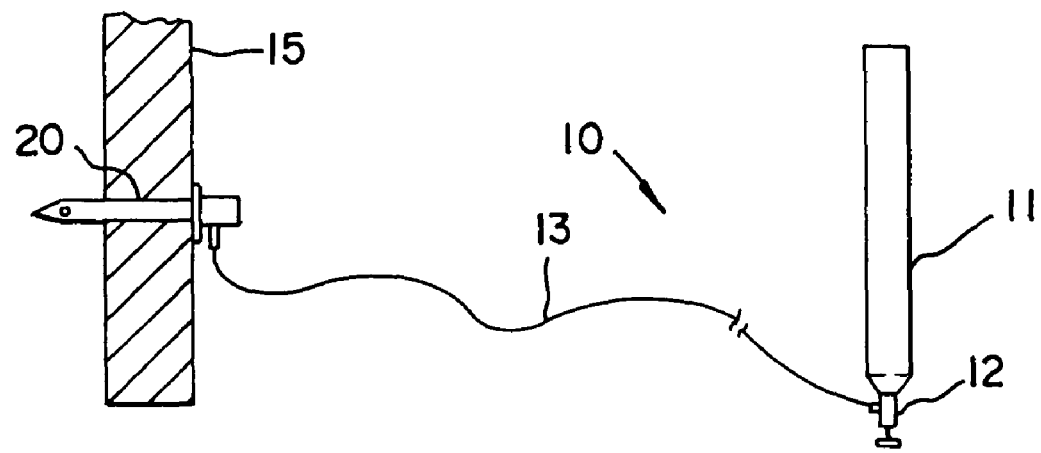
Figure 2:
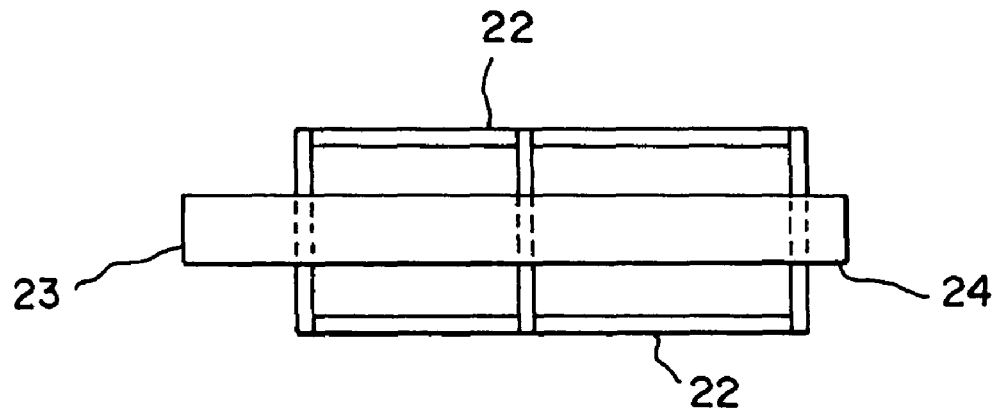
Figure 4:
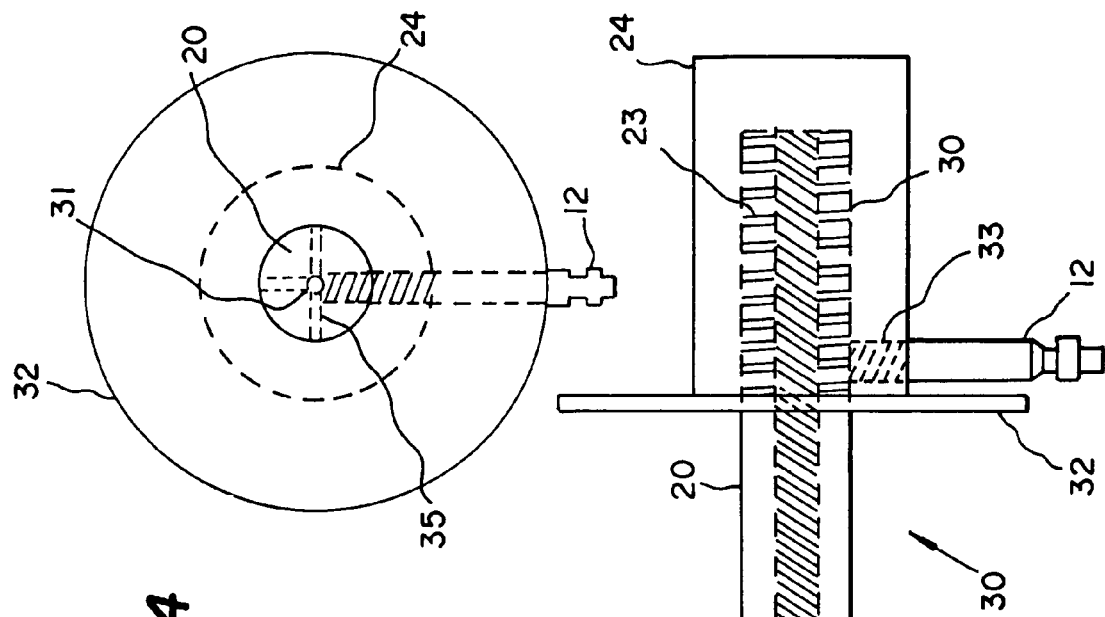
Figure 3:
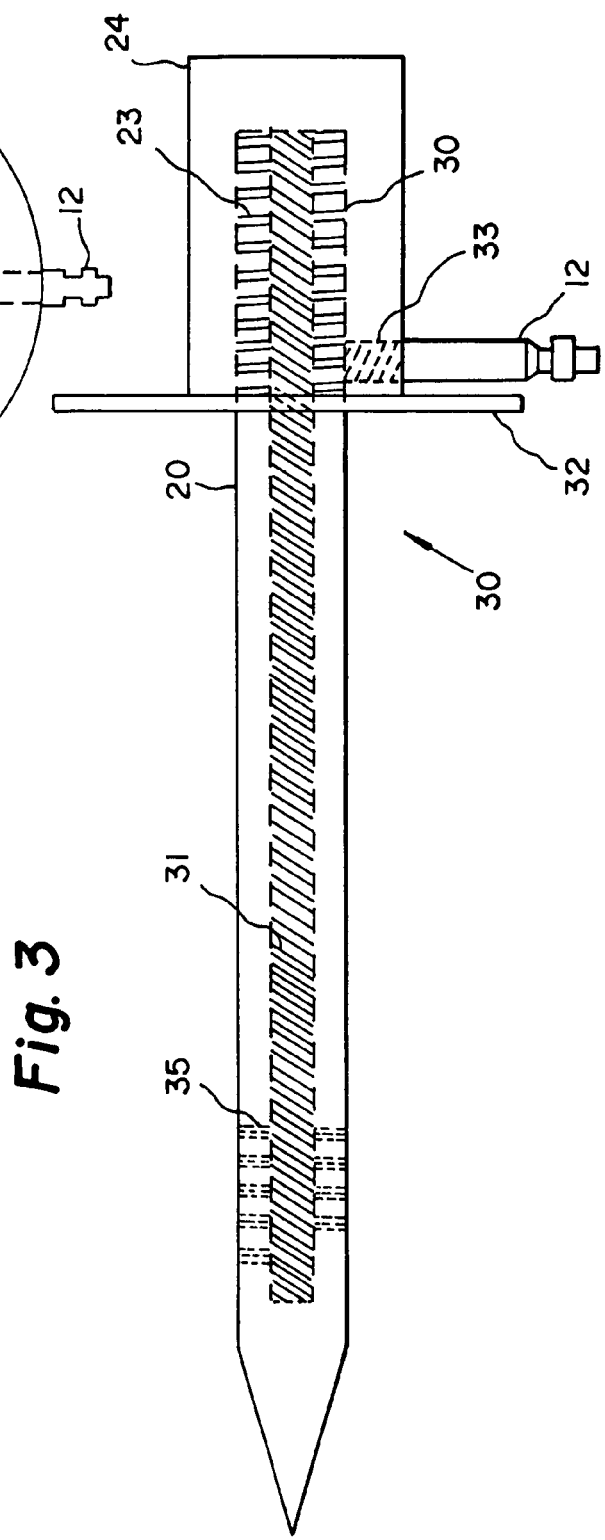
Figure 5:
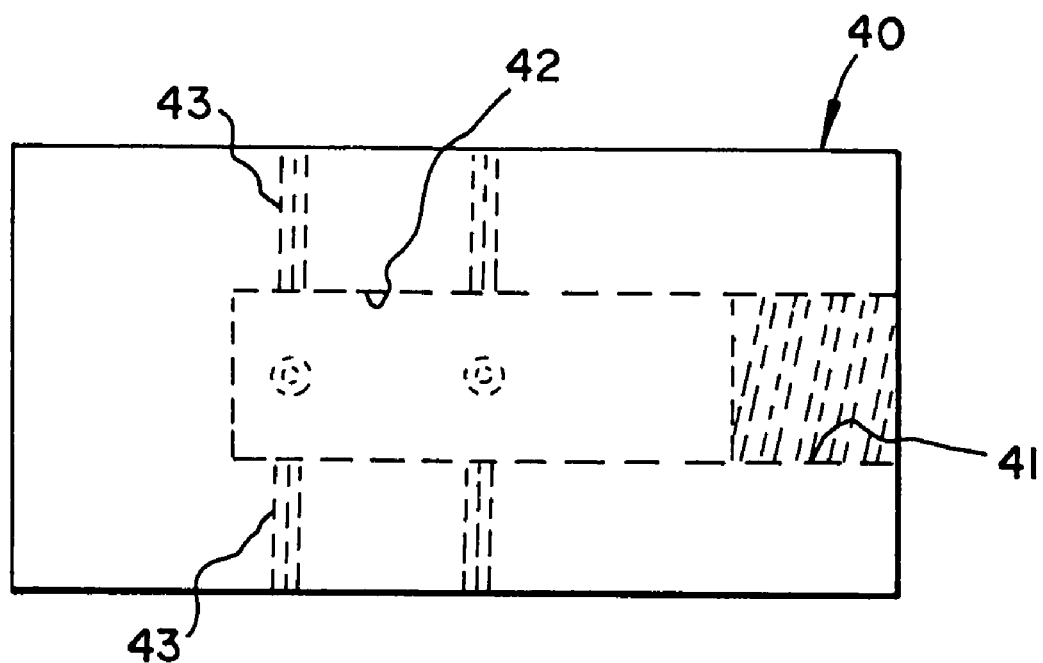
Figure 6:
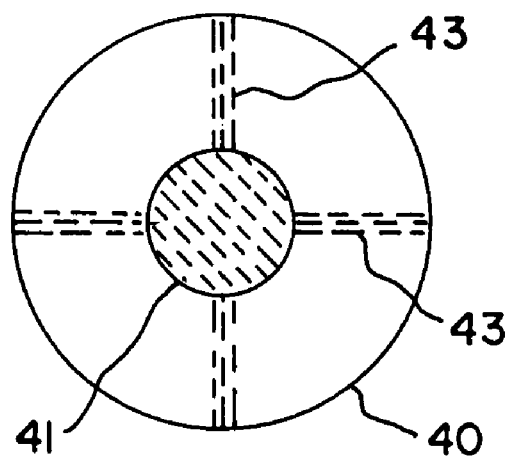
Figure 7:
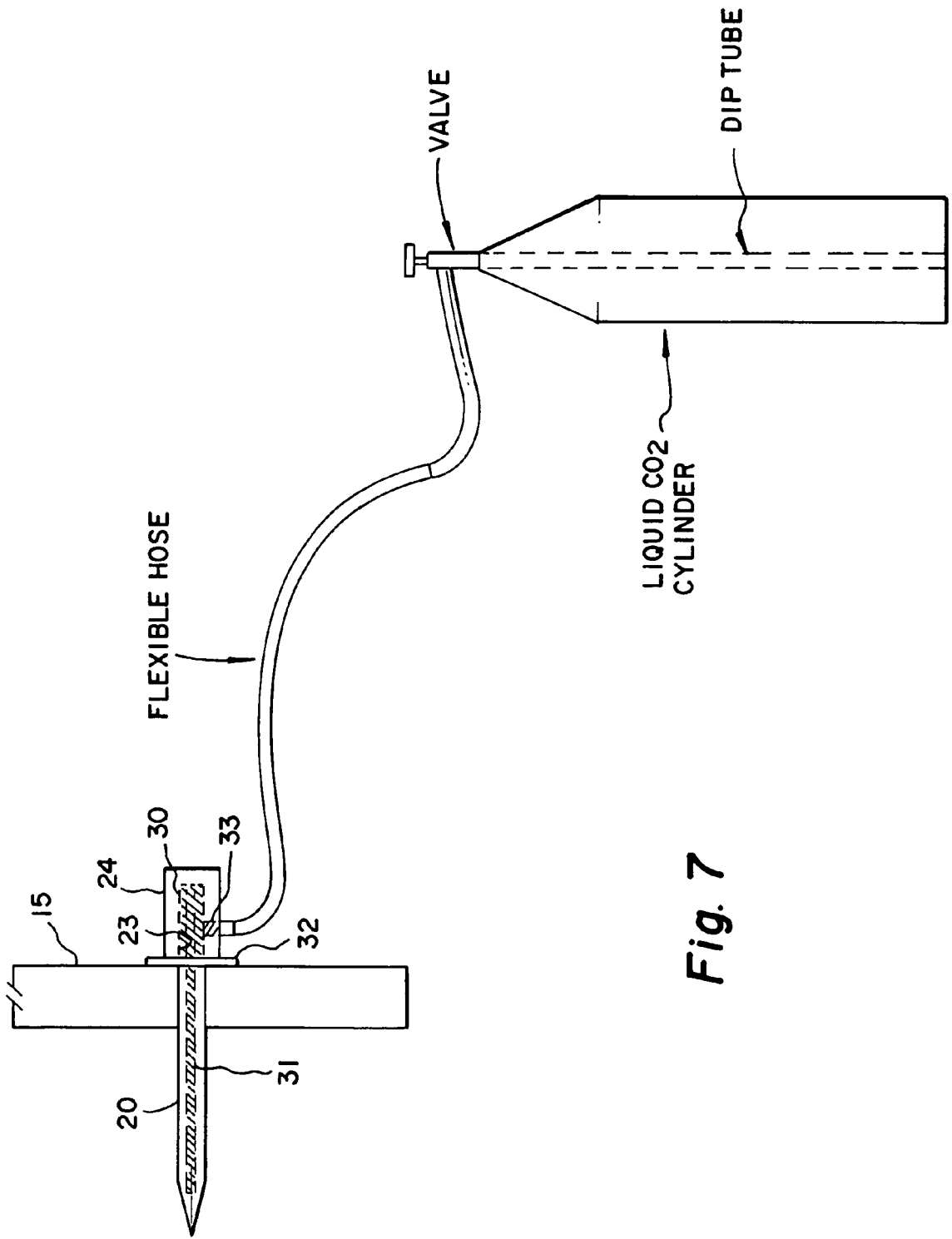
Figure 8A:
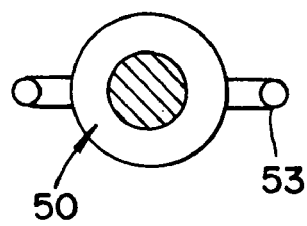
Figure 8B:
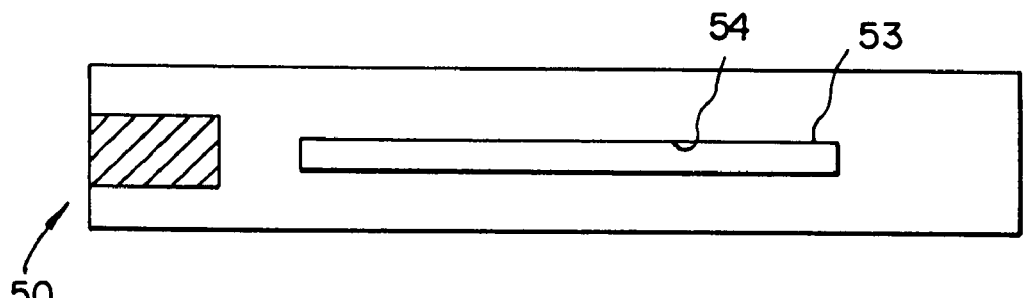
Figure 8C:
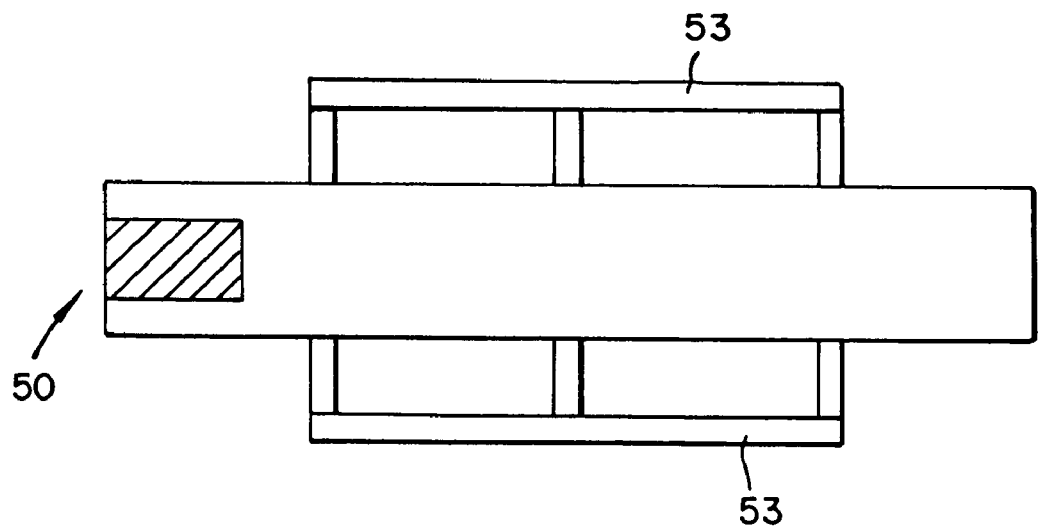
Figure 9B:
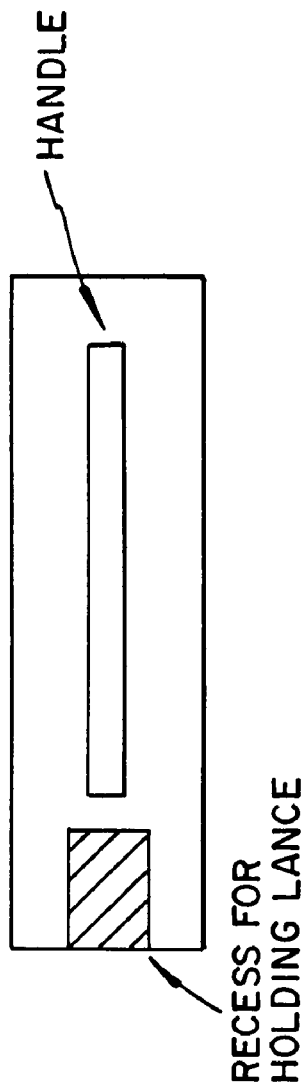
Figure 9C:
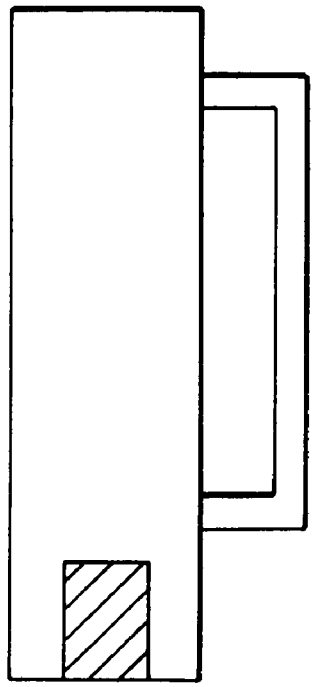
Figure 9A:
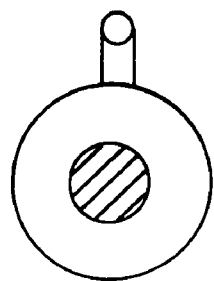

This application claims priority from U.S. provisional application 60/437,813, filed on Jan. 2, 2003.

This invention relates to a tactical weapons system which is non-lethal in its application and can be used to deal with terrorists in an effective and rapid manner while minimizing harm to any hostages or other innocent people in the process.

This invention gives both military personnel and civilian law enforcement an alternative weapon to be used as an assault weapon when dealing with heavily armed hostile opponents in confined or semi-confined spaces where lethal force is applicable and they wish to avoid collateral damage to hostages, their own personnel and/or the destruction of soft materials or evidence. It is a process to be used in conjunction with several specially designed components for different purposes.

BACKGROUND ART

There is no patented background art that a search uncovered. The only close system involved the system the Russians used early in 2003 when they introduced a gas, in that case, a biologic agent, into the confines of the opera house. The agent resulted in deaths of some of the hostages as well as the terrorists.

GENERAL DESCRIPTION OF THE INVENTION

The method of use involves inserting a gas in such volume as to cause a state of narcosis in the occupants of a confined space, such as a building or commercial aircraft cabin, in order to render them helpless or unconscious to facilitate their removal from the space thereby reducing the risk to authorities wishing to remove the occupants. The preferred gas is carbon dioxide. The preferred method of introducing the gases is by inserting the gas in a liquid state when the gas is readily liquefied and transportable. The specific gas used and method of introduction depends on the exact situation.

When dealing with determined opponents the use of an odorant to disguise the gas may be used. In some instances the odorant can be that of a natural gas or a petroleum product so as to give the illusion of the space being filled with an explosive gas in preparation of igniting said gas to destroy the space and its inhabitants. This gives the law enforcement group leverage as the opponents are trying to deal with the appraised threat they are being neutralized. In such a situation they will be reluctant to do anything that will ignite the gas such as discharge of a weapon and be more open to surrender discussions. In the case of the use of carbon dioxide once the level of the gas has risen to twelve or fifteen percent by volume in the given space it causes rapid unconsciousness and does not become lethal until one has been exposed for a few hours at a level of twenty five percent. This allows for a rather large error factor in calculating the volume of the given space and also for a large time factor error which reduces the risk of collateral damage.

Since carbon dioxide is a naturally occurring gas produced by the human body it is readily released by the body allowing for a rapid recovery from a state of narcosis or unconsciousness also currently manufactured gas masks will not filter out the carbon dioxide or nitrogen, etc., since they are designed to filter actual particles in manufactured gaseous weapons. Without a self contained supply of fresh air there is virtually no defense against this system when employed properly and with such an air supply the time factor for such air supply only delays the effects of the inert gas. Lethality is determined by the user. It may be used only to subdue or it may be used to terminate opponents by intentionally raising percentage levels to twenty-five or more percent to become lethal.

In the scenario involving the highjacking of an airplane, the carbon dioxide system, already installed on the plane, may be released by means of an electrically operated valve into the air supply in a gaseous state to raise the levels to twelve to fifteen percent in areas except for the cockpit. Such a level would render the assailants harmless and allow for the restraining of them by personnel from the cockpit area using small air packs stowed in the cockpit area. After restraining the assailants the craft could then be ventilated and the oxygen levels returned to normal. Since carbon dioxide has virtually no odor of its own the assailants as well as passengers would simply pass out without warning and then can be revived shortly by ventilating the aircraft.

SPECIFIC DESCRIPTION OF THE INVENTION

The gases mentioned herein can be delivered manually, by motorized vehicle, by aircraft or some other delivery vehicle. One of the devices consists of a heavy hollow steel lance with openings near the sharp pointed and designed to penetrate modern construction such as non solid masonry walls, light steel doors, roofs, etc. This lance has a rather large disk at the rear end designated to stop the progression of penetration, at a given point to prevent over penetration. The disk is connected to a rather large steel cylinder shaped adapter that serves both as a connector for the following ram and a connection port for a high pressure flexible hose which carries the inert gas either in a gaseous or liquefied state. The connecting cylinder has machined ports and openings in it to facilitate the inert material flowing thru it into the lance and out the dissipation ports near the lance's end. This connecting cylinder is then placed in a hollow receiver in the end of the given ram and then manually thrust through the structure at the desired point, the valve to the cylinder of inert gas is connected to one end of the high pressure flexible hose and the other end connected to the connection cylinder at the ram/lance junction. Upon penetration of the desired structure the inert material cylinder is opened and the inert material is released in the high pressure hose which then travels into the lance and into the structure. Since this is a rather bulky device it is designed to penetrate basically exterior surfaces where the arc for motion necessary to produce sufficient penetration is not restricted.

Another device is basically the same except has a smaller shorter ram version to facilitate its use in close quarters such as narrow hallways, interior walls, etc.

Another embodiment of the invention comprises a heavy cylinder with passageways machined into the interior connecting to distribution holes machined into the exterior with a single hose connection port. It's design allows for the device to be thrown or swung into frangible area such as a window or glass door. The weight of the device allows for enough energy to pull the flexible hose and still fracture and penetrate the frangible area. The gas is then released into the space.

The fourth embodiment of the device is designed to be installed in an aircraft and be delivered similar to a bomb. It consists of a high strength steel cylinder with a large capacity hollow interior which is directly connected to a penetrating ram point which penetrates a rupture disk that seals the inert material in the hollow chamber upon impact with most any solid object. When this cylinder is connected at the rear/opposite end of the ram point to an undersized parachute used as a drag parachute to keep the cylinder from tumbling in flight and to keep the ram penetrator aligned with the direction of flight allowing the cylinder to strike ram end first causing the penetrator to pierce the rupture disk thereby releasing the inert material without rupturing the cylinder and causing too rapid a release of the inert material and allowing for enough velocity to penetrate most modern construction roofs. Such devices could have been used in Tora Bora, Afghanistan allowing the terrorists to be captured alive and interrogated to retrieve information lost with their demise.

A fifth embodiment is a very heavy hardened steel enlarged lance basically the same as the first two designed to be vehicle mounted, it's designed to be used with heavy vehicles such as armored vehicles like tanks. It has a very heavy hardened steel ram mounted solidly to the vehicle so as to facilitate the vehicle using it's weigh and power to force the lance through most any construction and releasing the inert material through the exterior of the structure and avoiding having personnel exposed at any point to the hazards of combat by being in the safety of the armored vehicle. Such an arrangement could have been used in the standoff with the Branch Davidian Compound without the huge loss of life that occurred.

The final embodiment is a simple coupling that has a hollow chamber with the gas exit hole smaller than the entrance hole to couple the hoses by means of a threaded connection allowing for tube sealed with low pressure rupture disk on each end to be placed in the line of the gas flow to rupture the disk releasing the odorant into the flow of gas/inert material.

A secondary benefit of the use of carbon dioxide in this system is that of fire suppression. When the carbon dioxide levels increase to the necessary levels to facilitate the desired results, the oxygen levels decline to levels that can retard or prevent combustion depending on the materials contained in the given space.

This system and method is unique and has never been used before and can eliminate the use of toxic materials and biologics with their normal hazards which accompany usage. It is environmentally friendly unlike poisonous or toxic materials. It is structure friendly in that it allows preservation of the space and its surrounds, whether it be a structure or a aircraft cabin. In doing so it helps prevent fires and in general, is not harmful to the users thereof.

OBJECTS OF THE INVENTION

An initial object of this invention is to provide an inert tactical weapons system for use against terrorists and the like.

Another object of this invention is to provide a method for neutralizing a hostage situation without gross injury or death to the participants.

Yet another object of this invention is to provide a system for introducing CO2 gas into a contained space for the purpose of neutralizing a terrorist or in a hostage situation.

Still another object of this invention is to provide a system for introducing CO2 into a confined space by employing a ram to create an entry port for introducing the gas.

It is another object of this invention to provide a variety of rams for use in creating a port in a wall of a confined space, the ram having a means for introducing gas into the space.

An additional object of this invention is to provide a system for installation on a commercial aircraft by which CO2 can be introduced into the cabin space of the aircraft.

A further object of this invention is to provide a system for introducing CO2 into a structure by the use of an insertion nozzle adapted to fit under an existing door.

These and other objects will become apparent when reference is had to the accompanying drawings in which;

FIG. 1 shows the overall system for penetration of a wall with a member connected to a CO2 tank.

FIG. 2 shows a manual ram used in the process.

FIG. 3 shows a side view of a penetrator lance used in the process of introducing CO2 into a structure or space.

FIG. 4 shows an end view of the penetrator of FIG. 3.

FIG. 5 shows the side view of the cylinder of the penetrator member.

FIG. 6 shows the end view of the cylinder of FIG. 5 with a connector.

FIG. 7 shows the overall system in greater detail than FIG. 1.

FIG. 8*a* shows the end view of a long ram used in the process.

FIG. 8*b* shows a side view of the long ram used in the process.

FIG. 8*c* shows the top view of the long ram used in the process.

FIG. 9*a* shows the end view of the short ram used in the process.

FIG. 9*b* shows the side view of the short ram used in the process.

FIG. 9*c* shows the top view of the short ram used in the process.

FIG. 10 shows the system mounted on a commercial aircraft.

FIG. 11 shows the end view of an under the door wedge.

FIG. 12 shows the side view of the door wedge of FIG. 11.

DETAILED DESCRIPTION OF THE INVENTION

Referring to FIG. 1 there is shown the overall device noted as 10 which has an inverted CO2 cylinder 11 with a valve 12 to which is attached a high-pressure hose 13 which allows gas to flow to a penetration lance 20 which has been forced through the wall or door 15 of a confined space.

To get the lance through the door a ram is used and a manual version is shown in FIG. 2 as 21. It consists of handles 22 for grasping, a heavy steel cylinder 24 for kinetic energy transfer to the lance and a hollow insert such as 23 for connection to the lance.

FIGS. 3 and 4 show a lance member 20 which consists of a threaded portion 30 which is adapted to be screwed into the end of a cylinder such as 24, and is hollow as at the hollow portion 31 connects with a port 33 to which the valve 12 of a CO2 cylinder such as 11 connects. The gas flows from the cylinder via a hose to the hollow portion 31 which, after the lance penetrates the wall or door, allows gas to flow to dissipation holes 35 which allow the gas to enter the atmosphere of the enclosed space. A stop disk 32 surrounds the rear of the lance where it connects with the cylinder so as to limit the penetration of the lance and prevent damage to the valve 12.

FIGS. 5 and 6 show a heavy steel cylinder 40 having a threaded portion 41 for insertion of a lance member, the portion extending rearwards in a smooth portion 42 which is connected to dissipation holes 43 to allow for flow of the gas.

FIG. 7 shows a blown up view of the configuration of FIG. 1 which the cylinder 11 having a dip tube 44 which allows for measured dispersion of the gas, valve 12, hose 13, and lance 20 with cylinder 24. The arrangement of the hose, second valve 12, threaded portion 30 and bore 31 is shown in greater detail.

FIGS. 8*a* through 8*c* show views of a long ram 50. It consists of a long cylinder 51 having a lance recess 52 and handles 53.

FIGS. 9*a* through 9*c* show views of short ram 60 consisting of a cylinder 61 having lance recess 62 and handles 63.

Figure 10:
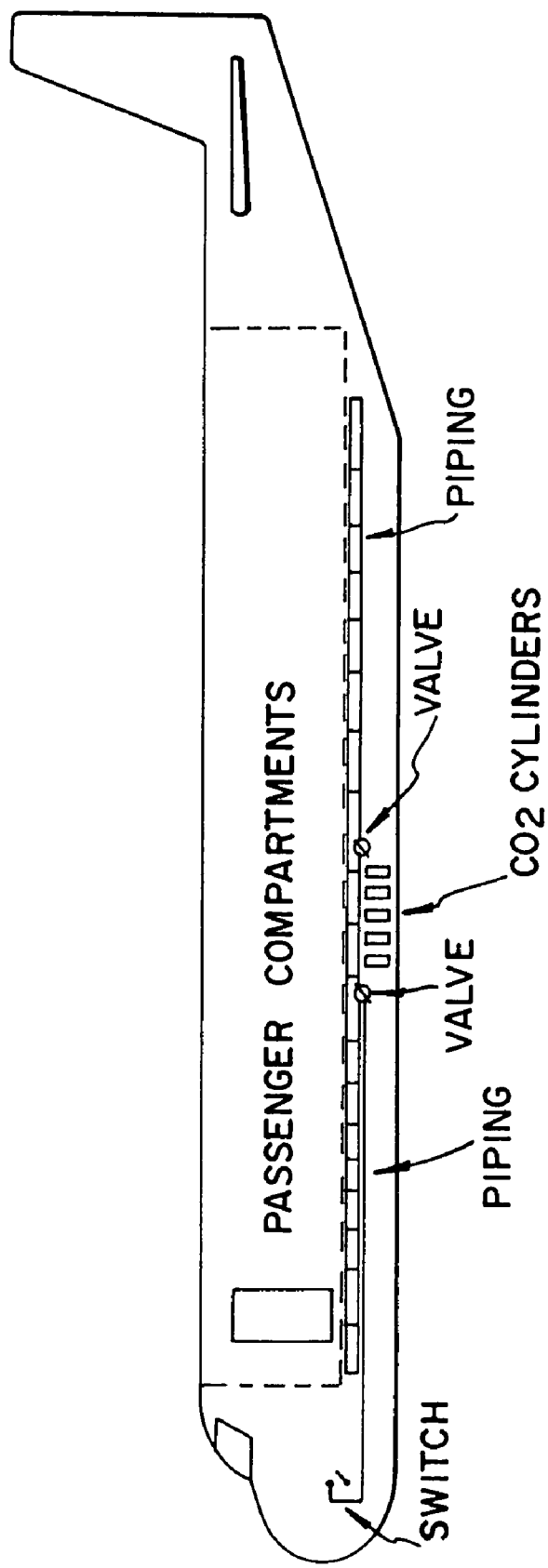

FIG. 10 shows a cross section of an aircraft 70 which has passenger compartment 71 and cockpit area 72. Piping 73 runs under the passenger compartment and allows gas from CO2 cylinders 74 to flow through valves 75 to the compartment to neutralize any terrorists or highjackers. A switch 76 in the cockpit controls the valves 75 to allow for the flow of gas.

Figure 12:
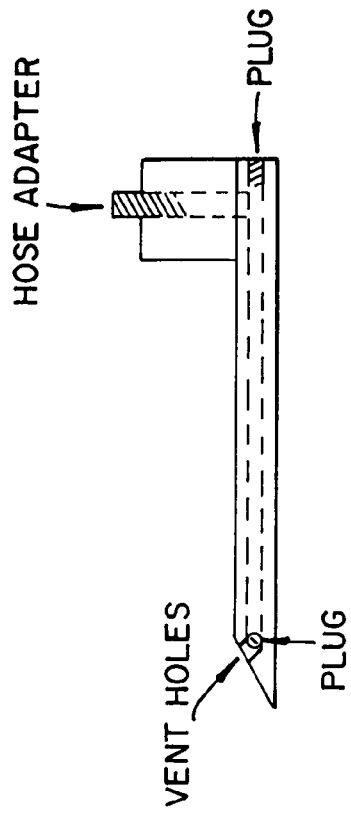
Figure 11:
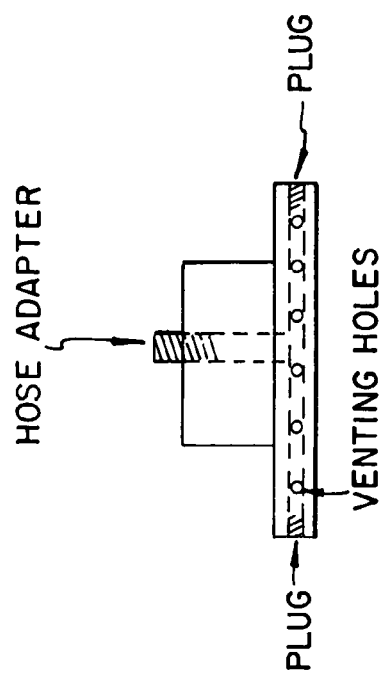

Finally, FIGS. 11 and 12 show the end and side views, respectively, of a wedge member 80 use in inserting the gas under the opening at the bottom of a door in a structure. It consists of a main portion 81 having a hose adapter 82 with a protruding section 83 which is slid under the door. Section 83 has a series of venting holes 84, 85 which are in communication with the hose adapter 82 which allows for gas to flow from a hose connected thereto to the holes 84,85. Plugs 86 are used to allow for different flow configurations of the device.

While several embodiments of the invention have been show, it will be obvious to those of ordinary skill in the art that many changes and modifications can be made to the invention without departing from the scope of the appended claims.

The invention claimed is:

1. A CO2 neutralizing system for use against terrorists and/or hostage takers within a confined space, said system comprising:

a source of CO2 which has an odorant mixed therewith to create a false impression of the nature of the gas, manual non-explosive means to create an opening in said space, and means to deliver said CO2 from said source into said space, said means to deliver said CO2 operatively connected to said means to create an opening.

* * * * *